Nov. 14, 1933.                    T. M. LOFTON                    1,935,510
                    FORK ATTACHMENT FOR SHOVELS AND THE LIKE
                              Filed Oct. 6, 1932
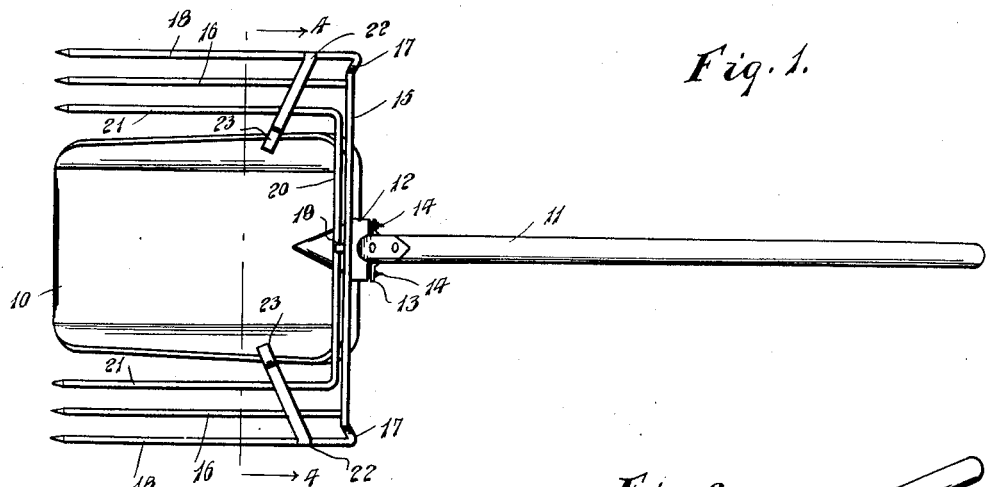
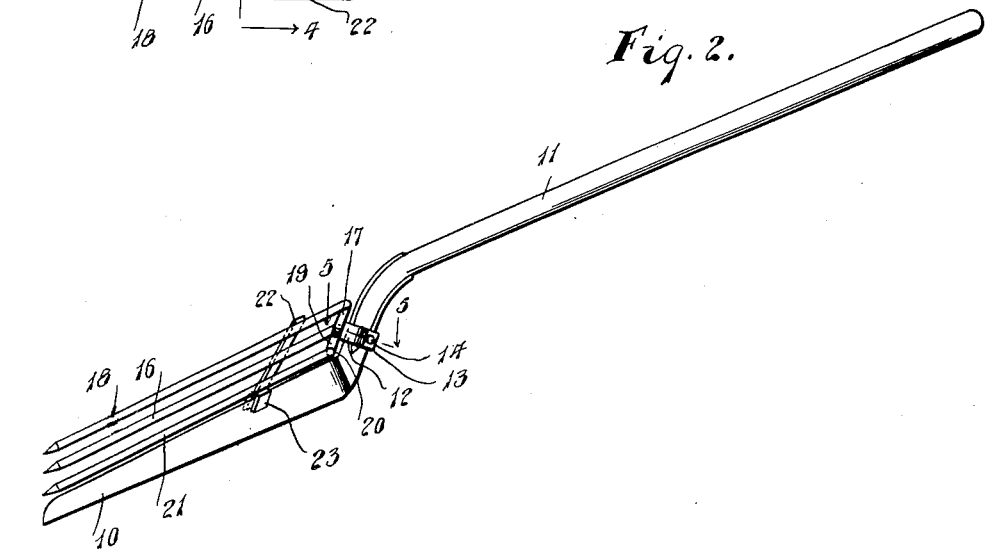
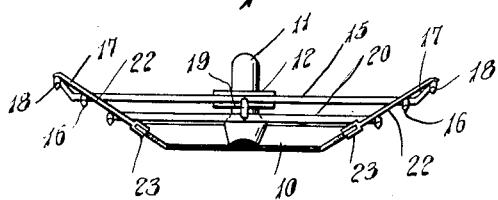
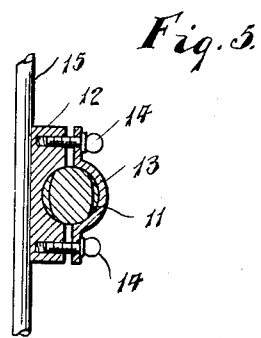
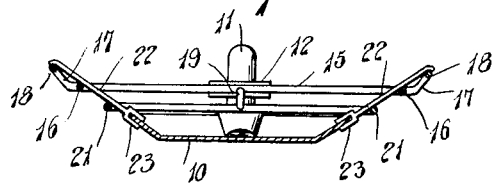
Inventor
T. M. Lofton.
By L. F. Randolph Jr.
Attorney Patented Nov. 14, 1933

1,935,510

UNITED STATES PATENT OFFICE 1,935,510

FORK ATTACHMENT FOR SHOVELS AND THE LIKE

Tollie M. Lofton, Wisner, La.

Application October 6, 1932. Serial No. 636,595

2 Claims. (Cl. 294—59)

The invention relates to a fork attachment for shovels and the like to augment the shovel in handling comparatively light material, such for instance as corn on the cob, ensilage, stable manure, chopped feed, etc., and has for its object the provision of an attachment to be secured to the handle of a shovel or the like and including a plurality of tines arranged on opposite sides of the shovel or other implement when in position thereon, for the purpose stated.

The invention will be described in detail hereinafter and will be found illustrated in the accompanying drawing, in which Figure 1 is a top plan view of the fork attachment showing it applied to a shovel, Figure 2 is a side view in elevation, Figure 3, a front view, Figure 4, a transverse sectional view on a plane indicated by the line 4—4 of Figure 1, and Figure 5 is a detail sectional view on a plane indicated by the line 5—5 of Figure 2.

In the drawing similar reference characters are used to designate corresponding parts in all of the views.

The fork attachment is shown in the drawing applied to a shovel having a blade or scoop 10 and handle 11. The attachment consists of a head member 12 that is adapted to be clamped to the handle of the shovel adjacent to the blade or scoop by means of a detachable strap 13 and secured to the head 12 by means of set screws or other suitable fastening means 14. Secured to the head 12 is a rod 15 having formed integral therewith forwardly projecting tines 16, and having its ends provided with upturned portions 17 with forwardly projecting tines 18 that are substantially parallel to the tines 16. Secured to the rod 15 by means of a short connecting rod 19 is another rod 20 that is substantially parallel to the rod 15 and has on its ends forwardly projecting tines 21 that are parallel with the tines 16 and 18, said tines 16, 18 and 21 being arranged on opposite sides of the shovel blade or scoop 10 and having their axes arranged on inclined planes so that said tines provide an auxiliary for the shovel blade or scoop 10 in handling material as hereinbefore stated.

Secured to the tines 16, 18 and 21 are brace rods 22 that have their adjacent ends bifurcated as shown at 23 to engage the side edges of the shovel blade or scoop 10 and thereby brace the tines.

In use it will be apparent that the attachment is extremely useful in handling ears of corn and other bulky products enabling movement of a larger quantity at each operation, and thus save time in handling products, the device providing means whereby the advantages of the shovel blade for getting under the product is augmented by the fork tines in loading the product on the shovel or scoop and in carrying or tossing it in loading operation.

What is claimed is:—

1. A fork attachment for the purpose stated, comprising U-shaped rod members secured together in parallel relation, a clamp member secured to said rod members to secure them to a shovel handle, the sides of said U-shaped rod members providing fork tines to cooperate with the shovel blade to augment the lifting capacity of its blade, and bars secured to the tines and having bifurcated ends to engage the side edges of the shovel blade to brace and space the tines.

2. In combination with a scoop shovel and handle, a fork attachment therefor having a plurality of tines arranged on opposite sides of the scoop shovel, inclined upwardly and outwardly therefrom and providing an auxiliary therefor, transverse rods carrying said tines, a clamp securing said rods to the handle, and a bar secured to the tines on each side of the scoop shovel and having a bifurcated portion engaging the edge thereof.

TOLLIE M. LOFTON.